United States Patent [19]

Fukahori

[11] Patent Number: 5,264,887
[45] Date of Patent: Nov. 23, 1993

[54] CAMERA

[75] Inventor: Hidehiko Fukahori, Kanagawa, Japan

[73] Assignee: Canon Kabushiki Kaisha, Tokyo, Japan

[21] Appl. No.: 923,499

[22] Filed: Aug. 3, 1992

[30] Foreign Application Priority Data

Aug. 20, 1991 [JP] Japan .................................. 3-208028

[51] Int. Cl.⁵ ............................................. G03B 17/02
[52] U.S. Cl. .................................. 354/288; 354/150; 354/152; 354/202
[58] Field of Search ................. 354/288, 150, 152, 202

[56] References Cited

U.S. PATENT DOCUMENTS

| | | | |
|---|---|---|---|
| 3,866,240 | 2/1975 | Tsujimoto | 354/152 |
| 4,319,816 | 3/1982 | Kellner | 354/152 |
| 4,555,169 | 11/1985 | Suda et al. | 354/152 |
| 4,941,010 | 7/1990 | Aihara et al. | 354/152 |
| 4,963,902 | 10/1990 | Fukahori | 354/64 |

Primary Examiner—Monroe H. Hayes
Attorney, Agent, or Firm—Fitzpatrick, Cella, Harper & Scinto

[57] ABSTRACT

In a camera having a pentagonal prism, a focusing screen and a mirror box, the mirror box is molded integrally with a first mounting part for mounting the pentagonal prism and a second mounting part for mounting the focusing screen. The second mounting part is provided with a draft for mold release. The focusing screen is provided with a tapered projection, which approximately coincides with the draft of the second mounting part and extends along almost the whole periphery of the focusing screen.

8 Claims, 4 Drawing Sheets

CAMERA

BACKGROUND OF THE INVENTION

1. Field of the Invention

This invention relates to a camera having a mirror box integrally molded with a focusing-screen mounting part and a pentagonal-prism mounting part.

2. Description of the Related Art

Heretofore, the pentagonal prism and the focusing screen of a single-lens reflex camera have been mounted in a manner as shown in FIG. 4. As shown, the camera is provided with a pentagonal-prism mounting member 17, which is mounted on a mirror box 4. The pentagonal-prism mounting member 17 includes a focusing-screen mounting part 17a, mirror-box mounting parts 17b and 17c and a pentagonal-prism mounting part 17e. The focusing-screen mounting part 17a and the pentagonal-prism mounting part 17e are arranged in parallel to each other. The pentagonal-prism mounting member 17 is provided further with an aperture 17d for guiding a reflected light flux coming from a mirror 6 to a pentagonal prism 7.

Referring again to FIG. 4, a focusing screen 1 is urged to move upward, as viewed in the FIGURE, by a leaf spring 19. The focusing screen 1 is thus caused to be abutting on the focusing-screen mounting part 17a of the pentagonal-prism mounting part 17 throughout the periphery thereof. A focusing-screen frame 18 is arranged to hold the focusing screen 1 and the leaf spring 19. The focusing screen 1, the leaf spring 19 and the focusing-screen frame 18 jointly form a focusing screen unit. The focusing-screen frame 18 is provided with projections 18a and 18b, which are arranged to engage and to be held by a focusing-screen mounting hole 4c which is formed in the mirror box 4 and a focusing-screen holding spring 20 which is secured to the mirror box 4. The focusing screen unit is arranged to be mountable and demountable by engaging and disengaging the focusing-screen holding spring 20 with and from the projection 18b. In other words, the focusing screen 1 and the pentagonal prism 7 are mounted on the pentagonal-prism mounting member 17 in parallel to each other. Further, the arrangement to have the focusing screen 1 abutting on the focusing-screen mounting part 17a throughout its periphery effectively prevents the intrusion of dust from coming from the inside of the mirror box 4.

However, the camera which is arranged in this manner has the mirror box 4 formed by aluminum or zinc die casting. Although the mirror box 4 formed in this manner is strong, it necessitates a secondary machining process which increases the cost. Besides, it is heavy. Further, since the pentagonal-prism holding member of the camera is discretely arranged, the conventional arrangement increases not only the number of parts but also the number of assembly work processes.

SUMMARY OF THE INVENTION

This invention is directed to the elimination of the above-stated shortcomings of the prior art.

One aspect of this invention therefore lies in the provision of a single-lens reflex camera wherein a mirror box is integrally molded together with a pentagonal-prism mounting part and a focusing-screen mounting part; the focusing-screen mounting part has a draft for mold release; at the time of mounting a focusing screen in the camera, the focusing screen completely abuts on the focusing-screen mounting part along the whole periphery thereof; and the focusing screen is provided with a tapered projection which approximately coincides with the draft in such a way as to make the focusing screen parallel with the pentagonal-prism mounting part, so that the camera can be arranged to have a sufficient strength even if the mirror box is molded of a plastic material and also to be unaffected by the draft for mold release at the time of molding the mirror box.

The above and other aspects and features of the invention will become apparent from the following detailed description of an embodiment thereof taken in connection with the accompanying drawings.

DETAILED DESCRIPTION OF THE PREFERRED EMBODIMENT

Figure 1:
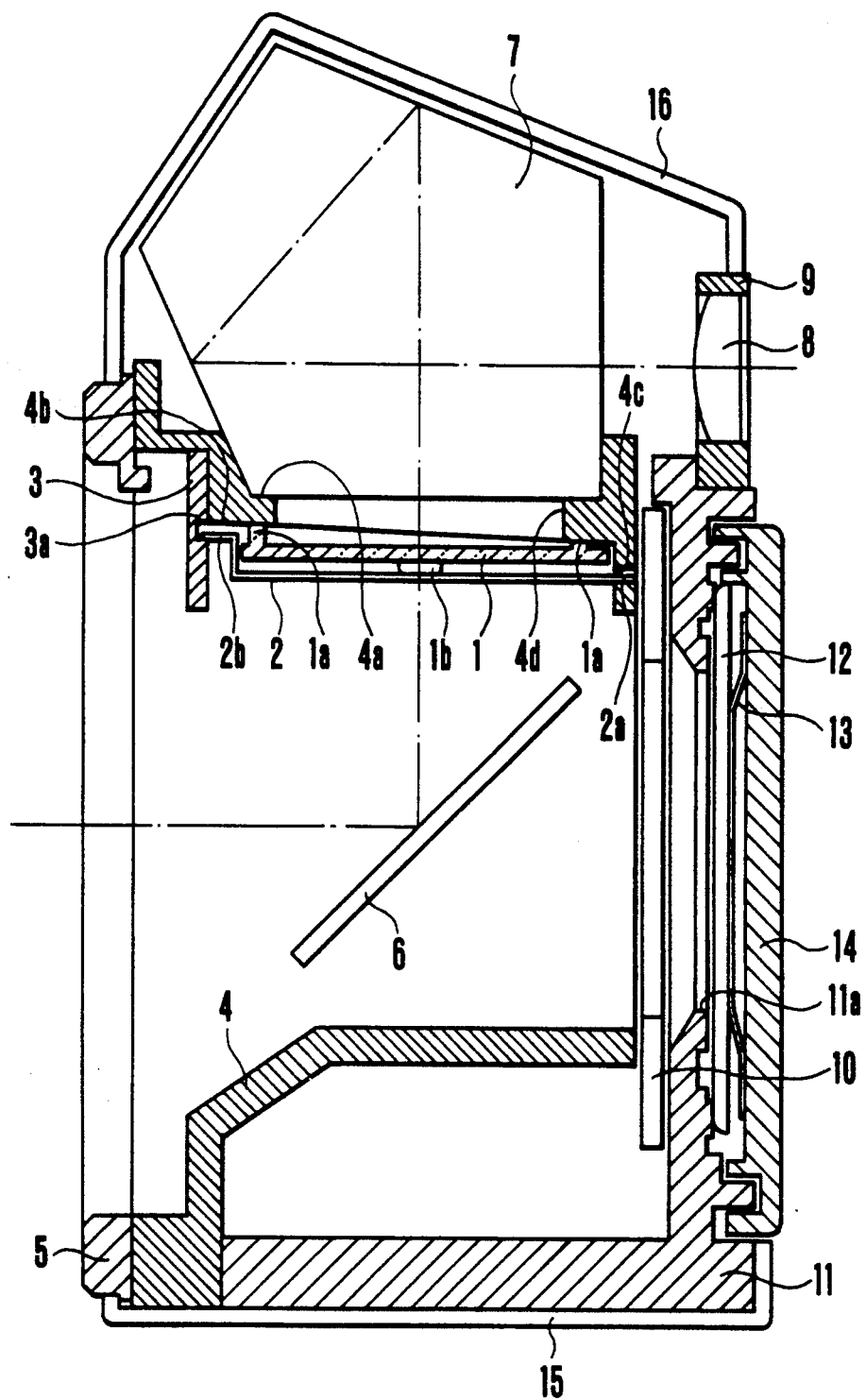
FIG. 1 is a central sectional view showing the arrangement of a camera as an embodiment of the invention.
Figure 2:
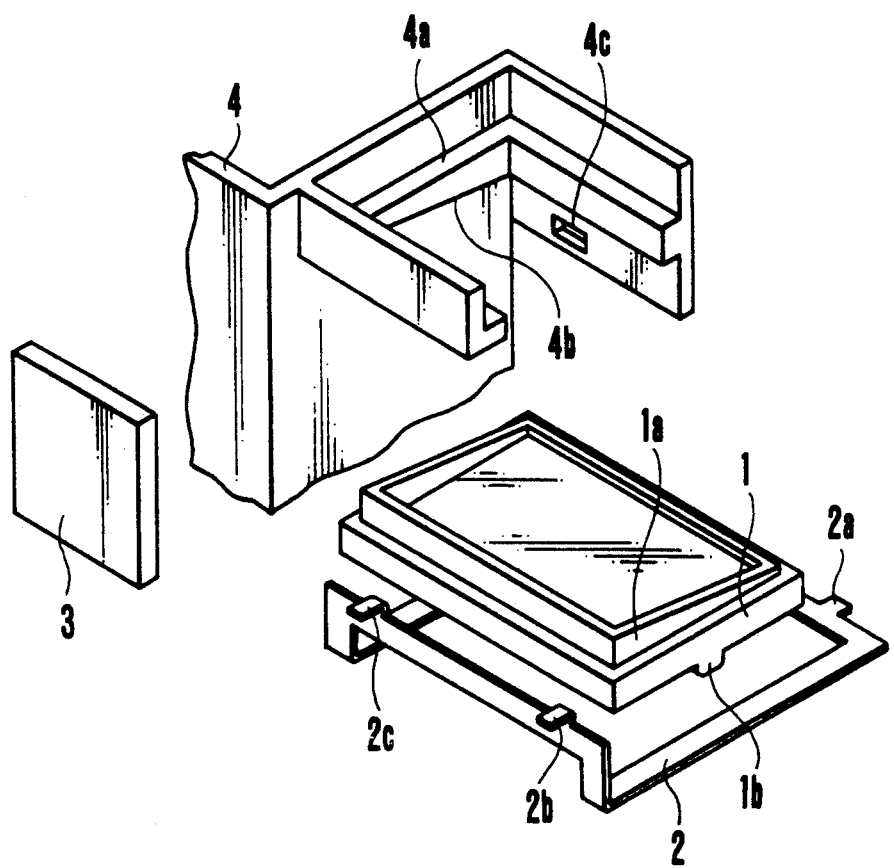
FIG. 2 is an oblique view showing the details of a focusing-screen mounting part shown in FIG. 1.

FIGS. 1 and 2 show an embodiment of this invention. Referring to FIG. 1, a focusing screen 1 includes a tapered projection 1a and a spring-abutting part 1b. A focusing-screen retaining spring 2 includes engaging parts 2a, 2b and 2c. A blind plate 3 is secured to a mirror box 4 and is provided with an engaging part 3a for engaging the engaging parts 2b and 2c of the focusing-screen retaining spring 2.

The mirror box 4 is molded of an engineering plastic such as a polycarbonate material with some fiber-reinforcing agent such as glass fiber or carbon fiber mixed in the material as necessary. The mirror box 4 has a pentagonal-prism mounting part 4a and also a focusing-screen mounting part 4b. The focusing-screen mounting part 4b is provided with a tapered face, which is formed on the lens side of the camera (on the left side as viewed in FIG. 1) in conformity with the structural arrangement of a mold in use, for the purpose of withdrawing the mirror box 4 from the mold at the time of molding. The mirror box 4 is provided further with an engaging hole 4c for engaging the engaging part 2a of the focusing-screen retaining spring 2 and an aperture 4d for guiding a light flux reflected from the mirror 6 to a pentagonal prism 7 through the focusing screen 1. A mount 5 is secured to the mirror box 4. The mirror 6 is disposed within the mirror box 4 so as to be in a down position for guiding light to the pentagonal prism 7 to permit sighting, through a viewfinder, of an object to be photographed, and to be retracted from the photo-taking light flux (in an up position) in photographing.

The pentagonal prism 7 is disposed above the mirror box 4. An eyepiece lens 8 is secured to an eyepiece-lens holding frame 9. A shutter 10 is disposed between the mirror box 4 and a camera body 11. The camera body 11 mainly includes a film transport mechanism and is provided with an aperture 11a. A pressing plate 12 is arranged to keep the film in a flat state. A leaf spring 13 is arranged to urge the pressing plate 12. A back lid 14 is arranged to be openable and closable. The film can be replaced by opening the back lid 14. Reference numerals 15 and 16 respectively denote bottom and upper covers, which are exterior members respectively arranged to cover the camera.

Referring to FIG. 2, a fixing part for the focusing screen 1 is described in detail as follows: If the pentagonal-prism mounting part 4a is molded integrally with the mirror box 4, the mold-release direction of the focusing-screen mounting part 4b must be decided to be either toward the side of the lens or toward the side of the back lid. This reason is as follows: If the mold-release direction is a downward direction, no thickness would be left for the lower side of the mirror box 4, thereby extremely lowering the strength of the mirror box 4 if the mirror box 4 is molded of a plastic material. Besides, an AF (automatic focusing) mechanism is arranged in the lower part of the mirror box 4 in general. Therefore, it is advantageous, also in terms of precision, to have the lower side of the mirror box integrally molded.

In the case of this embodiment, the mold is released from the focusing-screen mounting part 4b toward the side of the lens. For this purpose, the focusing-screen mounting part 4b is provided with a draft for mold release inclined toward the side of the lens. The focusing screen 1 is provided with the tapered projection 1a, which is formed as a peripheral projection in a peripheral part outside of the effective light flux to be guided to a viewfinder and is arranged to approximately coincide with the draft of the focusing-screen mounting part 4b. Such being the arrangement, when the focusing screen 1 is mounted and set in position with the leaf spring 2, the pentagonal-prism mounting part 4a and the focusing screen 1 are assembled in parallel to each other since the draft of the focusing-screen mounting part 4b and the inclination of the tapered projection 1a approximately coincide with each other. Further, the focusing-screen mounting part 4b is formed along the periphery of the focusing screen 1 to ensure that the focusing-screen mounting part 4b abuts on the tapered projection 1a of the focusing screen 1 throughout the whole periphery thereof.

Figure 3:
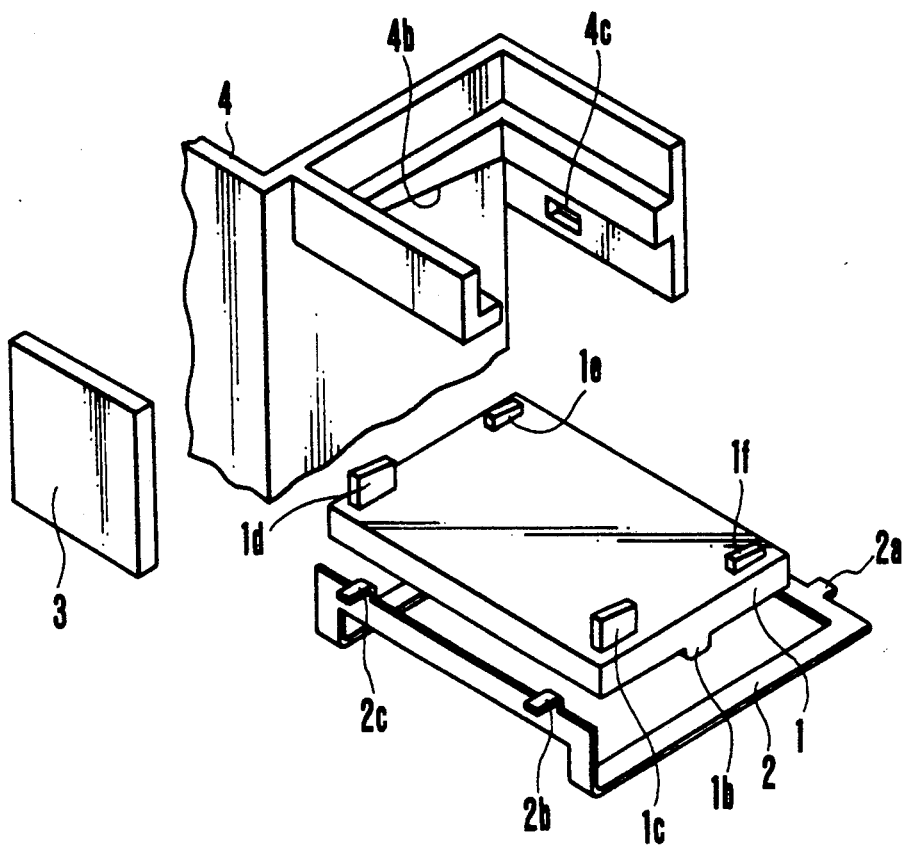
FIG. 3 is an oblique view showing in detail an inadequately arranged focusing-screen mounting part.
Figure 4:
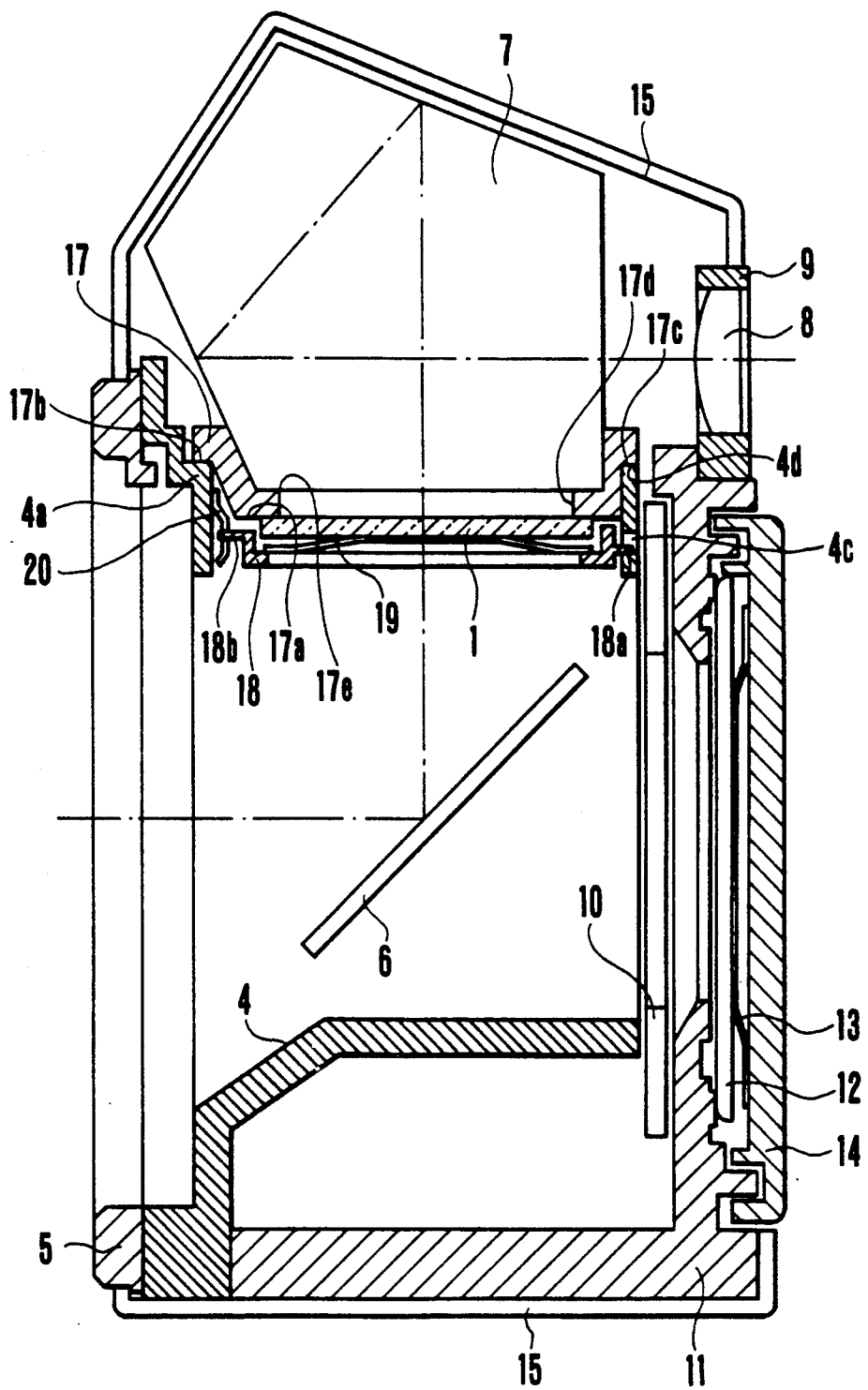
FIG. 4 is a central sectional view showing by way of example the arrangement of the conventional camera.

If it is necessary only to compensate for the draft of the mirror box 4, the compensation can be accomplished by providing projections 1c to 1f at the four corners of the focusing screen 1 as shown in FIG. 3. This arrangement is, however, only capable of compensating for the inclination. The focusing-screen mounting part 4b does not abut on the focusing screen 1 along the whole periphery thereof. Under such a condition, dust tends to stick to the surface of the focusing screen 1 due to clearances remaining between the focusing screen 1 and the focusing-screen mounting part 4b.

Since the pentagonal-prism mounting part is molded integrally with the mirror box, as described in the foregoing, the embodiment enables the mirror box to have a sufficiently greater molding thickness than the mirror box of the conventional camera. The greater molding thickness then ensures a sufficient strength with the mirror box made of a plastic material. Therefore, the arrangement according to this invention permits a reduction in the number of parts, in cost and in weight. Further, the arrangement to provide the tapered projection extending along the whole periphery of the focusing screen in conformity with the draft of the focusing-screen mounting part enables the focusing screen to abut on the focusing-screen mounting part throughout the periphery of the focusing screen. The focusing screen thus not only can be fixed in position without slanting but also effectively prevents the intrusion of dust onto the surface thereof.

What is claimed is:

1. A camera comprising:
   a) a pentagonal prism;
   b) a focusing screen; and
   c) a mirror box molded integrally with a first mounting part for mounting said pentagonal prism and a second mounting part for mounting said focusing screen, said second mounting part of said mirror box being provided with a draft for mold release, and said focusing screen being provided with a tapered projection which extends along almost the whole periphery of said focusing screen and approximately coincides with said draft of said second mounting part.

2. A camera according to claim 1, wherein said mirror box is molded by releasing a mold from said mirror box toward a lens side of said camera in the direction parallel with an optical axis along which light enters said camera and said tapered projection of said focusing screen having a greater amount of projection at the lens side of said camera relative to an amount of projection at a back of said camera.

3. A camera according to claim 1, wherein said mirror box and said first and second mounting parts are integrally molded of a plastic material.

4. A camera according to claim 1, wherein said tapered projection of said focusing screen is formed on an area outside an effective light flux onto said pentagonal prism.

5. A camera comprising:
   a) a pentagonal prism;
   b) a focusing screen; and
   c) a mirror box molded integrally with a first mounting part for mounting said pentagonal prism and a second mounting part for mounting said focusing screen, said second mounting part of said mirror box being provided with a draft for mold release, and said focusing screen being provided with a projection formed to compensate for said draft of said second mounting part on an area of said focusing screen where said focusing screen abuts on said second mounting part.

6. A camera according to claim 5, wherein said mirror box is molded by releasing a mold from said mirror box toward a lens side of said camera in the direction parallel with an optical axis along which light enters said camera and said tapered projection of said focusing screen having a greater amount of projection at the lens side of said camera relative to an amount of projection at a back of said camera.

7. A camera according to claim 5, wherein said mirror box and said first and second mounting parts are integrally molded of a plastic material.

8. A camera according to claim 5, wherein said projection of said focusing screen is formed on an area outside an effective light flux onto said pentagonal prism.

* * * * *